Feb. 14, 1967 G. A. GIANNUZZI 3,303,775

VARIABLE SPEED PRINTER APPARATUS AND TYPE CARRIER DEVICE THEREFOR

Filed Sept. 20, 1963 2 Sheets-Sheet 1

INVENTOR

GEORGE A. GIANNUZZI

BY John S. [signature]

ATTORNEY

TYPE SET

| | | | | | | | | | | | | | | | | | | | |
|---|---|---|---|---|---|---|---|---|---|---|---|---|---|---|---|---|---|---|---|
| 1 | A | 2 | B | 3 | C | 4 | D | 5 | E | 6 | F | 7 | G | 8 | H | 9 | I | 0 | J |
| 1 | K | 2 | L | 3 | M | 4 | N | 5 | O | 6 | P | 7 | Q | 8 | R | 9 | S | 0 | T |
| 1 | U | 2 | V | 3 | W | 4 | X | 5 | Y | 6 | Z | 7 | / | 8 | . | 9 | , | 0 | $ |
| 1 | # | 2 | ¤ | 3 | * | 4 | % | 5 | @ | 6 | & | 7 | - | 8 | △ | 9 | ( | 0 | ) |

United States Patent Office 3,303,775
Patented Feb. 14, 1967

3,303,775
VARIABLE SPEED PRINTER APPARATUS AND TYPE CARRIER DEVICE THEREFOR

George A. Giannuzzi, Vestal, N.Y., assignor to International Business Machines Corporation, New York, N.Y., a corporation of New York Filed Sept. 20, 1963, Ser. No. 310,373
5 Claims. (Cl. 101—93)

This invention relates to printing and more particularly to a printer apparatus operative at high rates of speed and a type carrier device therefor.

In one form of high speed printer, the print mechanism comprises a type carrier device having an array of type representing various characters to be printed. Printing is done by moving the array of type characters relative to a print station at which a print medium is located and against which the type are selectively brought. Imprints are formed by striking the type against the print medium, or vice-versa, using one or more print actuators such as print hammers. The imprints are made on-the-fly or while either the type or the print medium is at rest. For operating the various print hammers to selectively strike the various type on arrival at predetermined print locations, a control means is provided which includes a storage device having plural storage locations corresponding to the various print positions and a type tracking means operative to identify the characters appearing at the various print positions. In synchronism with the movement of the type characters relative to the print hammers, character signals are derived from the storage means locations. The storage signals are compared with signals generated by the tracking means for type appearing at the corresponding hammer positions. A hammer selector conditions the hammer operator corresponding with the storage location being read and is fired on signal from a comparison device in the event an identity is achieved with the storage and character tracking means. In a line printer, the print station comprises a plurality of print hammers arranged in a row; the character array is designed and arranged so that every type character of the array is presented once in each print cycle to every print position. At the completion of a cycle, a complete line of information is printed and the print medium may be advanced to a new line posiition in preparation for printing a subsequent line of data in a subsequent print cycle.

Type carrier devices for such printers have taken various forms. In general, they have comprises an array of type characters formed of a plurality of sets of different types, these sets being arranged in succession. Each set included characters from plural type groups such as numeric, alphabetic and special characters or various combinations of these. The tracking means would conveniently comprise a counter mechanism, or the like, designed to generate coded signals in a sequence which corresponds to the sequential arrangement of the characters in the sets and as they appear in the array.

In data processing systems, the number of different characters required for record printing varies from one application to another. For example, in some accounting applications, the numeric group of characters is sufficient. But in scientific applications, the numeric and alphabetic group of characters along with a large number of special characters are required. The above examples more or less represent extreme applications and many other applications are encountered in data processing applications in which the number of characters may vary widely between the two extremes. For example, in bank accounting, certain operations require primarily the numeric group characters, some or all of the alphabetic group and a very few special characters such as the comma, dollar sign and the period. In addition to variations in character requirements between different applications, some data processing installations involve data recording where the character demands are variable. For example, a statistical operation may require printing data which records 80% numeric informatioin, 15% alphanumeric information and 5% alphanumeric and special character printing. In such applications it frequently occurs that the data is recorded with several lines of numeric information followed by a few lines of alphabetic or alphanumeric information and relatively few lines of data with characters of all three groups.

In general, it has been found that recording speeds, i.e., lines of data output per unit of time, is directly related, among other things such as paper feed, etc., to the number of different charactres in a type array. Also, assuming the rate of moving type remains constant, the greater the number of type characters in an array, the longer the print cycle. In other words, the greater the number of characters in a type array, the longer the time for presenting every type character to each print actuator at a print position. Thus, where a standard type array is used for all the different applications, some installations have the benefit of operating at maximum output while others operate considerably below it. One solution to increase the output speed levels for some applications has been to provide a different type array for different operations. For example, an all numeric type array might be substituted for an alphanumeric array where only numeric operation printing is to be conducted. Since there are considerably fewer characters in a numeric than in an alphanumeric array, the print cycle is considerably shortened so that output speed is increased. Likewise, two or more alphanumeric arrays having various combinations of alphabetic, numeric and special characters may likewise be provided to fit the needs of the particular data processing recording job. Thus only the exact number of characters would be included in an array and the print cycle might be altered accordingly. However, such practice requires more than one type array to be maintained on hand which adds to the cost of installation. Further, the interchange of arrays requires shutdown of the recorder equipment thus reducing the record speed output which is to be realized in the time in which the job is to be done. Additionally, interchangeability of type arrays is not an effective solution in those applications where the data being recorded follows a pattern where one or two lines of alphabetic or alphanumeric information is to be followed by recording several lines of numeric information.

It is an object of the present invention to provide a type carrier device for a line printer apparatus which permits the apparatus to print at variable output rates dependent on the number of different types of type characters being printed in any line of data from a single array of type.

It is also an object of the present invention to provide a line printer apparatus capable of operating at variable line output print rates from a single array of type as the groups of characters from which data is recorded varies from line to line.

It is a particular object of the present invention to accomplish the above objects in a high speed printer apparatus.

It is a further object of the present invention to accomplish the preceding objects in a printer apparatus having a continuous array of type wherein the various type characters are moved in a continuous path relative to a row of print actuators.

It is a still further object of this invention to provide a type carrier device having a single array of type which includes characters of the numeric, alphabetic, and special symbol groups for use in a printer apparatus and which permits the operation of the printer at various output rates dependent on variations in combinations of said groups appearing in data recorded thereby.

The above as well as other objects are attained in accordance with this invention by providing a print apparatus having a print mechanism comprising a type carrier having an array of type in which certain type characters occur in the array more frequently than others. More specifically, the plural type which comprise the array are preferably arranged in one or more sets and in a continuous type carrier, plural sets are provided to form a plural chain of type. The sets are formed of plural characters representing plural groups of characters. In the array the type characters of at least one type group occur more frequently than the type of other groups. The type or type group occurring more frequently is referred to hereinafter as the preferred type or the like. In one embodiment, the less preferred group is subdivided into subgroups, and the preferred group is arranged in the array to occur as many times as there are subgroups. The subgroups preferably are arranged to occur between each preferred group and the individual type of the subgroups may further be interspersed with type of the adjacent preferred groups. In such an arrangement a complete set of type in the array includes all the subgroups of the less preferred type and an equivalent number of the preferred group. The array may include one or more sets of type arranged in sequence.

In accordance with this invention the preferred group of characters are selected type which are to be printed most frequently in any one application. Since the preferred group occurs more frequently in the type array, it is readily seen that the frequency at which the preferred characters appear for printing is greater. Consequently, the time cycle required to print a line of data in a printer apparatus is considerably shortened and the print out rate in lines per minute, for example, of the printer apparatus is increased.

The foregoing and other objects, features and advantages of the invention will be apparent from the following more particular description of a preferred embodiment of the invention, as illustrated in the accompanying drawings.

Figure 1:
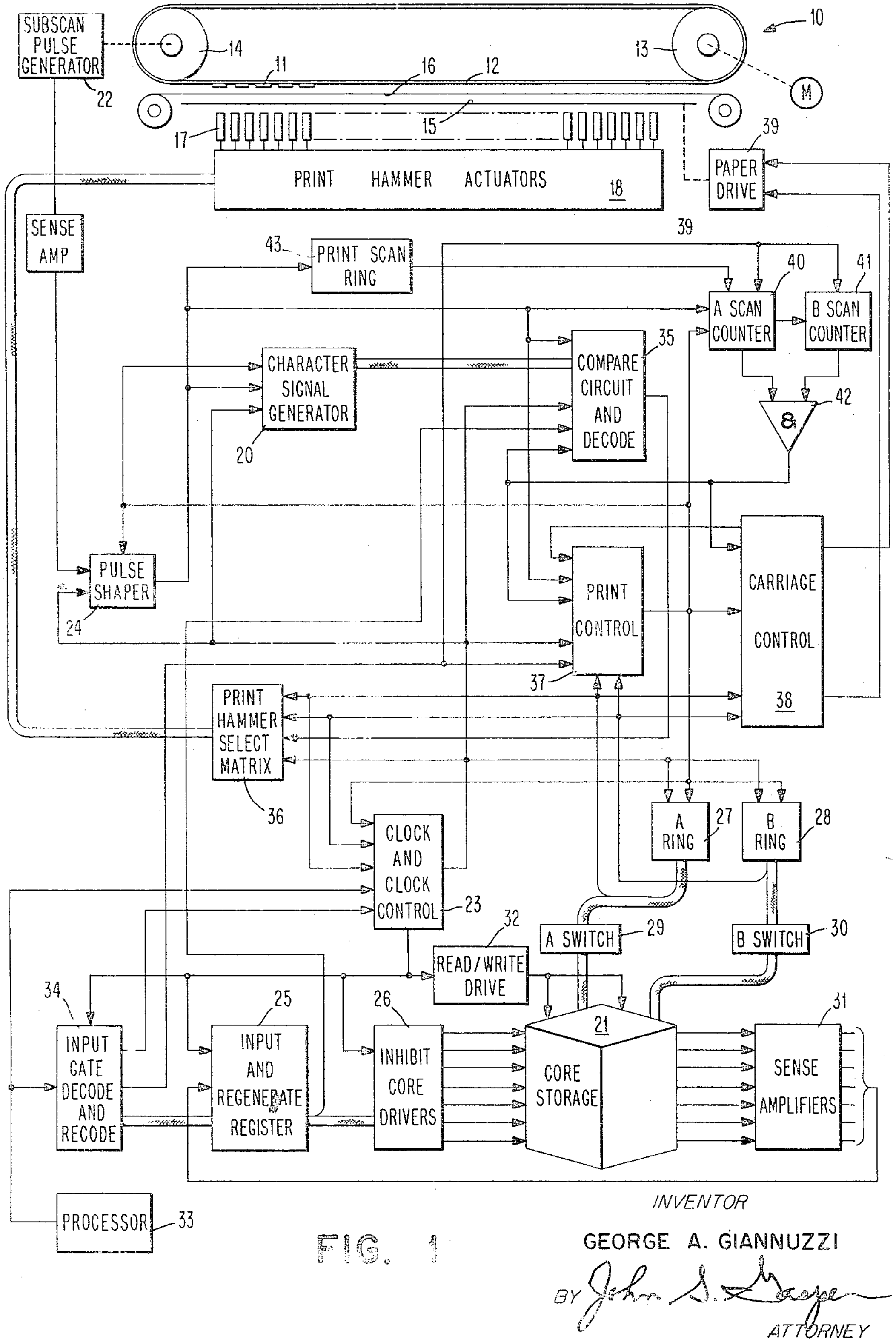
FIG. 1 is a schematic showing a print mechanism and controls therefor designed to print on-the-fly at high speeds in a type carrier device commonly referred to as a type chain.

Referring to the drawings:

FIG. 1 illustrates a printer apparatus comprising a print mechanism which includes a type carrier device taking the form of a type chain 10. In such construction a plurality of type elements 11 are attached to a type carrier element such as a continuous belt 12. The type elements are preferably removably attached to the continuous belt at uniformly spaced positions completely around the belt, thereby forming a continuous type array. Each of the type elements bears one or more engraved type characters on the face thereof. The type elements 11 are mounted on the belt 12 so that the array is comprised of one or more complete sets of type. Each set may contain numeric, alphabetic and special symbol characters. Details of the type element and type belt construction may be more fully obtained by reference to U.S. Patent 3,041,964 of V. R. Simpson et al., assigned to the present assignee. The type chain 10 is mounted on a pair of spaced drive wheels 13 and 14 adapted to be driven by motor means M so that the type chain moves at a constant speed transversely across a record strip 15 and an ink ribbon 16 of well known type. A plurality of print hammers 17 are arranged in uniformly spaced relation along the line of travel of the type elements and are designed to be individually operable by actuators 18 to strike the type elements 11 at appropriate times while they are in motion along the print line.

In the preferred embodiment of the print apparatus of FIG. 1, the characters on type elements 11 when arranged on the belt have a pitch different from the spacing of the hammers, as shown in U.S. Patent 2,993,437 of F. M. Demer et al. assigned to the same assignee as the present invention. Briefly described, the type elements 11 are spaced so that characters have a pitch 1.5 times the space of the print hammers 17. This pitch ratio produces a mechanical operation where type are aligned in a subcycle fashion. Specifically, every other type character will be aligned at every third print hammer during a subcycle, and three subcycles would be required for every hammer to see one type character. To print a complete line of data, there would be subcycles equal in number to three times the number of different type characters in one set of type. For example, with a pitch ratio of 1.5, 44 type would be aligned with 44 hammers along a print line in each subcycle and three subcycles would be required for characters to appear at 132 print hammers; and if there are 48 different characters in a type set, the number of subcycles would be 144 to complete a print line cycle. Considering the mechanical aspects of the printer apparatus further, the characters appear at hammer positions 1, 4, 7, 10, etc., in subcycle 1; at positions 2, 5, 8, 11, etc., in subcycle 2; and at positions 3, 6, 9, 12, etc., in subcycle 3. The pattern is then repeated in the following subcycles.

In the printer apparatus of FIG. 1, as the type elements 11 move along the row of print hammers 17, individual hammers are selectively operated to strike the print medium 15 and ribbon 16 against the appropriate type.

The operation of the hammers 17 is under control of a character signal generator 20 and a storage device 21. The character signal generator 20 which is preferably an electron counter circuit, one type of which is shown in the above-mentioned Demer et al. patent, operates on timing pulses from a subscan pulse generator 22 and a clock pulse generator 23 to generate a sequence of character signals in the order in which characters of the type elements 11 are aligned with the print hammers 17. In effect, the character signal generator 20 scans the type as they move along the print line and identifies which are in various positions during each subcycle. For each subcycle motion of the type, the character signal generator 20, on impulse from the pulse generator 22 and clock 23, performs a subscan operation during which the characters aligned at the separate subcycle positions are identified. The pulse generator 22 preferably is a magnetic drum having pulse generating marks thereon sensed by a pickup inductor. The output of the inductor is connected to pulse shaper 24 which is connected to the input of the character signal generator 20. The pulse generator 22 is geared to operate in synchronism with the advance of the type characters and is designed to generate a pulse at the beginning of each subcycle to initiate a subscan operation. The subscan pulse from the pulse generator 22 also starts the clock 23 operating to produce a series of timing pulses for the remainder of the subscan. Thus the pulse generator 22 is used to set the character signal generator 20 to the first position identifying the type character in the lead position at the beginning of a subscan and the signal generator 20 is advanced thereafter during the subscan by clock 23 to identify the remaining characters alignable during the type subcycle.

Coacting with the character signal generator 20 to produce selective hammer operation is a storage device 21 in which data to be printed is stored. The storage is preferably a 3-dimensional core array of six data planes and one check plane having storage locations equal in number to the number of hammers. The storage device 21 includes regeneration register 25 and inhibit core drivers 26, A and B address rings 27 and 28, respectively, operating through A ring switch 29 and B ring switch 30, and sense amplifiers 31 connected to storage output windings and having feedback connections to the input register 25. Data to be printed in read into storage 21 from a processor 33 through an input gating decode and recode device 34 under control of the clock control circuit 23. The clock 23 is also connected to the input and regenerate register 25, to the inhibit core drivers 26, and to the read and write driver 32 for the windings of the storage device 21.

For determining when a hammer 17 is to be operated, a compare circuit 35 is provided having connections to the output of the character signal generator 20 and to the output of the regeneration circuit 25. To control which hammer 17 is to fire, a hammer selection matrix 36 is provided. The hammer selection matrix 36 is operated in synchronism with the storage device 21; and for that purpose, matrix position selection is tied to the storage device by connection with the A and B address rings 27 and 28. Thus, when the rings address a position of storage, a corresponding hammer position is selected in matrix 36. When an identity signal is obtained at the comparison circuit 35, an operate pulse is derived on signal from the clock 23 and the operate pulse is gated by the hammer selection matrix 36 to the appropriate print hammer actuator 18. For each position of storage to be scanned, the clock 23 preferably operates to produce a series of pulses. The first pulse is used to address a storage location, advance the counter and read the data word back into the same position of storage 21. The read back also transfers the data word to the compare circuit 35. A second pulse to the compare circuit 35 produces an operate pulse to the selected hammer actuator 18.

The printer system of FIG. 1 further includes print control circuitry 37 which co-ordinates the operation of the printer with the processor unit 33. The print control 37 operation includes signaling when the printer is ready to print, when printing is complete and also provides a signal to carriage control 38 which operates the paper feed mechanism 39.

In accordance with the present invention, variable output speeds are attained from a single type array as will be more fully explained hereinafter. Essentially the present invention achieves the above result by an arrangement of type which effectively varies the length of time required for the print apparatus to complete a print cycle dependent on what class of characters are to be printed. To realize this advantage in actual print output speeds, the control system of FIG. 1 is provided with means for detecting the end of a print cycle and operating the print control 37 and the carriage control 38, to advance the carriage and to signal the processor 33 that the printer is ready to print more data. Illustrated in FIG. 1 is a control arrangement for a type array capable of operating at two output levels. In such arrangement a pair of cycle length control counters 40 and 41 are provided having outputs connected through switching gate 42 to the carriage operating portion of the print control 37 and to the carriage control 38. The input of the counters 40 and 41 is connected to input gate 34. The cycle control counters 40 and 41 are designed to be set on signal from the processor 33 at the time input of data is complete. For example, as will be shown later, if the data to be printed is all numeric, a numeric mode signal from the processor 33 is decoded to condition cycle control counter 40 to count a first level count. If alphanumeric data is to be recorded, an alphanumeric mode signal from the processor 33 through input gate decode 34 conditions both cycle control counters 40 and 41 to count a predetermined second level number of counts. In the preferred form, the counters 40 and 41 are designed to count a predetermined number of print scans performed by the control system during print operation. For that purpose, the input of the cycle control counters 40 and 41 is connected through a scan ring 43 to the pulse subscan generator 22. The scan ring 43 will preferably have as many stages as there are subscans in one print scan. With a type character pitch ratio of 1.5, the print scan ring 43 will have three stages. Thus every three subscan pulses will result in the scan ring generating a single scan pulse to the cycle control counters 40 and 41. In the numeric mode, on signal from the processor, only scan counter 40 counts scan pulses from the scan ring 43. In numeric mode, when cycle control counter 40 is filled, an output signal to AND gate 42 operates print control 37 and carriage control 38, which terminate the print cycle and advance the paper document. In alphanumeric mode, a signal from the processor 33 sets both cycle control counters 40 and 41. In alphanumeric mode, cycle control counter 40 counts to its predetermined level and when full, advances the counter 41 one count. The numeric counter 40 repeats its count cycle as many times as necessary to fill counter 41. In alphanumeric mode, when both counters are full, an output signal from both counters 40 and 41 through AND gate 42 to print control 37 and carriage control 38, terminate the print cycle and advance the paper feed 39.

Figures 2, 3:
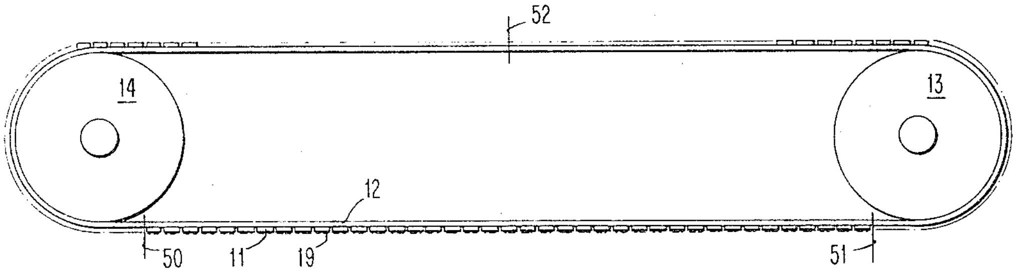
FIG. 2 is a schematic showing a type carrier type chain illustrating the arrangement of type characters to form a type array.
FIG. 3 shows a specific graphic arrangement of one complete set of a type array embodying the principles of the subject invention.

A specific type carrier device suitable for use in the printer apparatus of FIG. 1 is shown in FIGS. 2 and 3. In FIG. 2, a type chain of the type referred to in the previously mentioned patent of Simpson et al. comprises plural type elements 11 arranged on a flexible belt 12 or the like to form a continuous type array. Each type element 11 has two type characters 19 formed, e.g., by engraving, on the face thereof. The type elements 11 are arranged on the belt 12 in a manner so that the type characters 19 are uniformly spaced with a pitch ratio of 1.5. In addition, the type elements 11 are arranged so that the type characters 19 are assembled in a predetermined sequence or set. In the type chain of FIG. 2, three complete sets identified by the set lines 50, 51, and 52, are provided. Thus, in a print apparatus as previously described, the rotation of the drive wheels 13 and 14 will advance the type characters 19 along the row of hammers 17 with characters of one set being followed in the same sequence by characters of succeeding sets.

To obtain variable speed outputs depending on the nature of data to be printed using the type carrier device of FIG. 2, the type characters 19 are arranged so that certain characters appear more frequently on the type chain in each set. A specific arrangement of characters for a set is shown in FIG. 3, it being understood that three such sets would be provided in a type carrier device of the type shown in FIG. 2. While the type set in FIG. 3 shows the characters arranged in a row and column configuration, such an arrangement is for convenience in illustration, it being understood that the rows are arranged in succession to form a single row when used as a set in the type chain of FIG. 2. For example, the top row would be followed on the right by the second row from the top which is followed by the third row and so on. As shown in FIG. 3, the type set includes characters from the numeric group and the alphabetic group and the special symbol group. In the embodiment shown, the characters occurring in the set most frequently, i.e., the preferred characters, are a group of numeric characters 0–9. The alphabetic and special symbol characters form the less preferred group. In one form, the type characters are arranged so that the numeric characters occur four times in the character set while a complete group of the alphabetic plus certain special characters appears only once. Preferably, in the embodiment of FIG. 3, the alpha-special group of characters is divided into subgroups and, when arranged in the set, the numeric characters occur once with each subgroup. In addition, it is further provided that the numeric characters are interspersed between characters of the alpha-special subgroups. Thus, the numeric preferred group occurs in the set as many times as there are subgroups of alphabetic and special characters.

The arrangement of FIG. 3 is particularly suited where a relatively large number of different characters are to be printed which involves a substantial number of special symbols. Specifically, the type arrangement of FIG. 3 is useful for data recording applications requiring 14 special characters in addition to all the numeric and alphabetic characters, to provide an extended character set of 50 different characters. Of course, where fewer special symbols are required, the number of type in a set will be accordingly varied and the type chain might be altered to include more sets. Also, while the arrangement of FIG. 3 shows the alphabetic and special symbols interspersed with the characters of the preferred numeric group, the characters could also be arranged with the adjacent groups and subgroups compacted, with each group of numeric characters separated by a subgroup of alpha-special characters.

It is readily seen that with a type array having plural sets of type having a character arrangement as shown in FIG. 3, the numeric group of characters will appear at a greater frequency rate than the alpha-special during a print line cycle operation in a printer apparatus of the type shown in FIG. 1. Thus, with the numeric characters occurring more frequently on the chain, the length of time for the different numeric characters to scan every print hammer position is considerably less than the time required for all the different characters to do the same. Consequently, when the printer of FIG. 1 operates with the type array of FIG. 3, the print line cycle for numeric mode operation is 20 print scans in length, while the alphanumeric is 80 print scans. Therefore, for this specific arrangement, the cycle control counter 40 in numeric mode is set by the processor 33 to count 20 print scans. When the control circuitry has performed that number of scans, an entire line of numeric data will have been printed. In alpha-numeric mode (this includes the special characters) the cycle control counter 40 is set by the processor to count print 20 scans and the control counter 41 is set to count to 4. In this latter mode, the counter 40 will count 20 scans, 4 times, in order to fill counter 41, at the end of which the print control 37 and carriage control 38 will be operated to terminate printer operation and advance the paper drive 39. Thus it is seen that where numeric data is printed in a shorter time than that required for alphanumeric data, the print output speed is accordingly increased over that mode of operation where only a constant, single length print cycle is provided.

While in the embodiment shown the numeric characters are the preferred characters, alphabetic or special characters may be the preferred characters, and different combinations of characters not necessarily of the same class may be combined to form the preferred group.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In a printer apparatus, a print mechanism comprising a plurality of print positions having impact type print elements and a movable type carrier device having a first and second group of type characters formed in an array for presentation at a print position, said first group of type characters comprising a series of numeric characters, said second group of type characters comprising a series of alphabetic and special symbol characters, said second group comprising plural distinctive subgroups of characters, said first group and said subgroups being combined in said array in a predetermined order to form a sequence of type characters, said first group having a repetition rate at least equal to said number of said subgroups, and means for moving said type carrier for cyclically presenting said sequence of type to said print position whereby said first group of type characters is presented each cycle to said print position at a rate equivalent to said number of subgroups of characters, carriage means for effecting movement of a print medium to present different portions thereof at said print positions, print control means for scanning the print positions to provide for operation of the associated print elements in accordance with data from a processor, and means for controlling the carriage means including control means selectively operable in response to operation of said print control means for effecting operation of the carriage means to move the print medium.

2. In a printer apparatus, a print mechanism comprising a type carrier device in accordance with claim 1 in which said numeric characters of said first group are interspersed with characters of said subgroups.

3. In a printer apparatus having a plurality of print positions each with an impact type print element, a movable type carrier device movable past said print positions and having first and second groups of type characters thereon formed in an array for presentation to said print positions, said first group comprising a series of numeric characters, said second group comprising a series of alphabetic characters, said first group having a higher repetition rate on said carrier device than said other group, carriage means operable to move a print medium past said print positions, print control means operable to scan said print positions for effecting operation of the associated print elements in accordance with data from a processor, and means for effecting operation of the carriage means including counting means selectively operated under the control of the print control means in accordance with whether the data is numeric or alphabetic.

4. In a printer apparatus, a print mechanism comprising a type carrier device in accordance with claim 3 in which said numeric characters are interspersed with said alphabetic characters.

5. In a printer apparatus, a print mechanism comprising a type carrier device in accordance with claim 4 in which the means for controlling the carriage means includes a pair of preset control counters which are preset in accordance with data from the processor and are selectively operated under the control of the print control means to effect operation of the carriage means after different predetermined numbers of print scans, dependent on an indication from the processor that the data to be printed is numeric alone, or alphabetic or numeric and alphabetic.

References Cited by the Examiner

UNITED STATES PATENTS

| | | | |
|---|---|---|---|
| 1,338,014 | 4/1920 | Hart | 101—110 X |
| 1,552,108 | 9/1925 | Batdorf | 101—110 X |
| 2,762,297 | 9/1956 | Baer | 101—93 |
| 2,831,424 | 4/1958 | MacDonald | 101—111 X |
| 2,993,437 | 7/1961 | Demer et al. | 101—93 |
| 3,007,399 | 11/1961 | Sasaki et al. | 101—93 |
| 3,041,964 | 7/1962 | Simpson et al. | 101—111 |
| 3,128,693 | 4/1964 | Thiemann | 101—93 |

WILLIAM B. PENN, *Primary Examiner.*